Aug. 27, 1968   H. ULRICH   3,398,861
MOVABLE MATERIALS DISPENSING ARRANGEMENTS
Filed May 9, 1966   2 Sheets-Sheet 1

Inventor
Helmut Ulrich
By Michael S. Striker
Attorney

Aug. 27, 1968  H. ULRICH  3,398,861
MOVABLE MATERIALS DISPENSING ARRANGEMENTS
Filed May 9, 1966  2 Sheets-Sheet 2
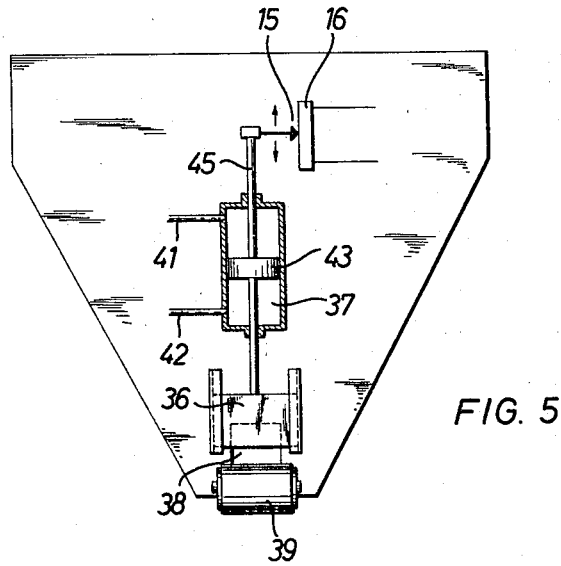
FIG. 5
FIG. 6
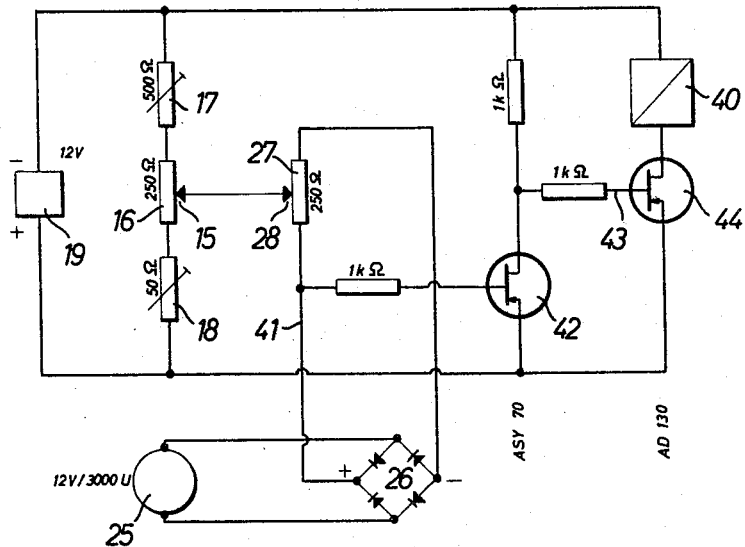

United States Patent Office 3,398,861
Patented Aug. 27, 1968

3,398,861
MOVABLE MATERIALS DISPENSING
ARRANGEMENTS
Helmut Ulrich, Munich-Allach, Germany, assignor to
European Engineering Trust Reg., Vaduz, Liechtenstein
Filed May 9, 1966, Ser. No. 548,443
Claims priority, application Germany, May 11, 1965,
E 29,270
11 Claims. (Cl. 222—52)

ABSTRACT OF THE DISCLOSURE

A material dispensing arrangement including a movable vehicle having a storage bin mounted on the vehicle for the purpose of retaining the material to be dispensed. The storage bin is equipped with an exit and a dispensing device which allows the stored material to be dispensed. An adjustng mechanism adjusts the dispensing device so as to allow more or less material to be dispensed depending upon the speed of the vehicle. The adjusting mechanism is operated by controlling signals generated in conformance with the speed of the vehicle so that the amount of the material dispensed varies in accordance with variations in the speed of the vehicle.

---

The present invention relates to an arrangement for dispensing materials from a moving vehicle in a manner that is automatically controlled in relation to the speed of the vehicle.

The dispensing of materials in the form of sand, rock salt, gravel, powders, etc., from moving vehicles, is known in the art. In general, the task associated with the dispensing of such materials is to produce an even distribution or spreading of the material along the path of the moving vehicle. To meet the requirements of this task, it is essential to control the rate at which the materials are dispensed as a function of the vehicle speed so that more or less materal is dispensed per unit of time depending upon whether the vehicle speed is increased or decreased. Heretofore, a manual operator would observe the prevailing vehicle speed on indicators provided thereon, and proceed to actuate mechanisms, thereafter, in a manner which would cause the dispensing rate to correspond closely to the vehicle speed. Manual control and operation of this type is undesirable because it is difficult to adjust the dispensing rate precisely in relation to small variations in the vehicle speed. After an extended period of time, fatigue of the operator would result in considerable unevenness of the material dispensed.

Accordingly, it is an object of the present invention to provide an arrangment whereby the dispensing rate of materials from a moving vehicle is automatically controlled in relation to the vehicle speed.

Another object of the present invention is to provide an arrangement as set forth, whereby the dispensing rate is maintained directly proportional to the speed of the vehicle.

A further object of the present invention is to provide an arrangement as set forth, wherein the controlling functions are carried out by electronically controlled motors.

A still further object of the present invention is to provide an arrangement as set forth, wherein the primary driving power is of hydraulic origin.

The novel features which are considered as characteristic of the invention are set forth in particular in the appended claims. The invention is illustrated by way of two embodiments both of which automatically detect the speed of the vehicle by means of a tachometer. In one embodiment the speed of a conveyor leading from the material storage means is regulated in relation to the vehicle speed. In the other embodiment, the speed of the conveyor is maintained constant while the size of the opening, through which the material to be dispensed exits from the storage means, is varied in relation to the vehicle speed.

The construction and mode of operation of the invention, however, will be best understood from the following detailed description and specification taken in conjunction with the accompanying drawing in which:

FIGURE 5 is a side view similar to that of FIGURE 2, and shows another embodiment of the invention in which the speed of the conveyor is maintained constant while the size of the opening, through which the material is to be dispensed from the storage facility, is varied in accordance with the vehicle speed.

FIGURE 6 is an electronic schematic diagram of the control circuit which actuates the hydraulic means for varying the size of the opening associated with the embodiment of FIGURE 5.

Figure 1:
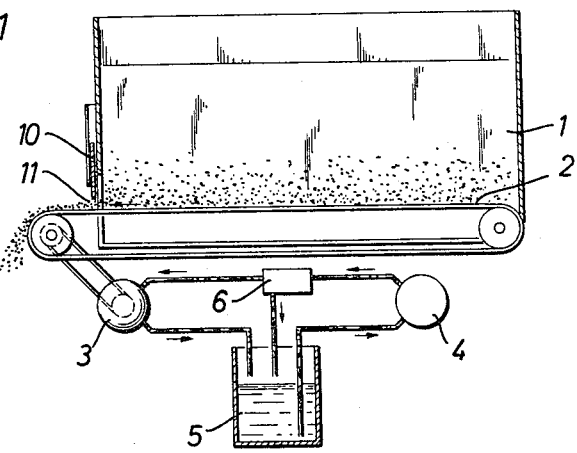
FIGURE 1 is a functional front-view diagram of one embodiment in which the speed of the conveyor dispensing the material from the storage facility is regulated in accordance with the speed of the vehicle, and the conveyor is driven by hydraulic means.
Figure 2:
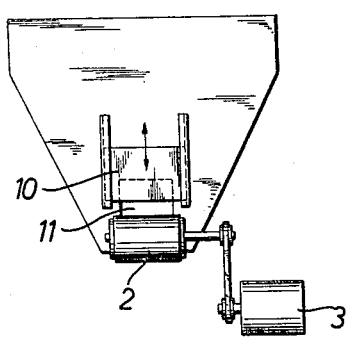
FIGURE 2 is a side view of FIGURE 1 and shows the details of the opening through which the material to be dispensed exits from the storage facility.
Figure 3:
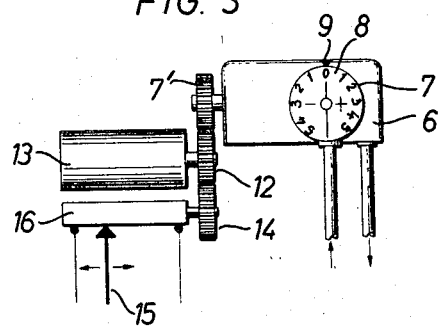
FIGURE 3 shows the manner in which the hydraulic drive is adjusted.

Referring to the drawing and to the embodiment of FIGURES 1–4, the material to be dispensed is contained in a storage bin 1. A conveyor belt 2 is located at the base of the storage bin. A hydraulic motor 3 is mechanically coupled to the conveyor belt and drives the latter. A hydraulic pump 4 operates the motor by transferring, under pressure, hydraulic fluid or oil contained in the reservoir 5 to the motor via a hydraulic circuit.

The hydraulic circuit includes a control valve 6 for regulating the flow of fluid between the pump and motor. The control valve 6 is setable by means of the positioning disc 7. When the "0" digit on the disc 7 lies opposite the indicator 9, the conveyor belt 2 operates at a particular speed. In the event that the disc 7 is positioned so that the indicator 9 points to any values in the positive (+) region of the disc, the conveyor belt may be implied to operate at a greater speed. If, on the other hand the disc 7 is rotated so that values in the negative (−) region lie opposite the indicator 9, the designation corresponds to lower speeds of the conveyor belt.

In the event that the dispensing of the material is regulated by means of adjusting the position of a slide 10 rather than the speed of the conveyor, a gear rack may be used to couple the gear 7' to the slide. The gear 7' is linked to the disc 7, and any rotation of the latter would be converted into translatory motion of either raising or lowering the slide.

The gear 7 meshes with the gear 12 coupled to the shaft of a positioning motor 13. The gear 12 meshes, in turn, with the gear 14 which drives the shaft 15 of a potentiometer 16. Shaft 15 is connected to the sliding contact of the potentiometer. Although it is possible, from the functional viewpoint, to connect the potentiometer 16 directly to either the gear 7 or 12, the introduction of a separate gear 14 allows for providing the proper gear ratio corresponding to the angular range of the potentiometer.

Figure 4:
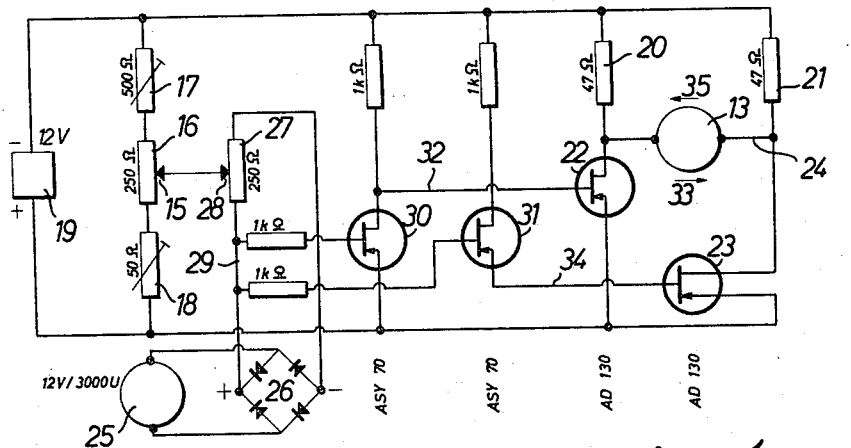
FIGURE 4 is an electronic schematic diagram of the circuit which controls the hydraulic drive associated with FIGURE 1.

The winding of the potentiometer 16 is connected across a direct-current power supply 19 via the trimming resistors 17 and 18, as shown in FIGURE 4. A section of the circuit shown in this schematic diagram, forms a bridge through means of the identical resistors 20 and 21, transistors 22 and 23, and positioning motor 13 which serves to adjust the hydraulic valve 6.

The speed detector is in form of a tachometer 25 which provides an electrical signal with magnitude proportional to the speed of the vehicle (not shown) which carries the material dispensing arrangement. The tachometer output signal is converted to direct-current form by means of the rectifying bridge 26, and applied across the winding of a potentiometer 27. Through proper positioning of the sliding contact 28 of the potentiometer 27, it is possible to realize a distribution of potentials so that no current flows through the bridge 24 when a particular normal speed prevails. Under such normal speed conditions, the "0" digit on the disc 7 lies opposite the indicator 9.

The normal speed of the vehicle, therefore, corresponds to a particular and definite rate at which the material is dispensed.

In the event that the vehicle carrying the dispensing arrangement increases its speed above the normal value, the tachometer provides a signal of increased magnitude in the connection 29. This increased tachometer signal has the effect of diminishing the current through the transistors 30 and 31.

As a result of the diminished current through transistor 31, the current through transistor 23 is also diminished. The decreased current through transistor 30, on the other hand, causes the connection 32 as well as the base of transistor 22 to become more negative. This effect operates to increase the current through the transistor 22, and produces a current flow through the motor 13 and resistance 21 in the direction of arrow 33. The motor 13 thus rotates in a manner by which gear 12 causes disc 7 to rotate so that the indicator 9 points to the positive region of the disc. In view of these conditions, the material dispensing rate is increased, and would continue to increase through further rotation of the motor 13 in the absence of additional circuit features.

The rotation of the motor 13 is limited and controlled, by means of potentiometer 16, so that it corresponds precisely to the vehicle speed. As a result of the rotation of gear 12, the sliding contact 15 coupled to gear 14, is driven in the direction toward negative potential. The positive potential of connection 29 is thus partially compensated by being reduced towards null, and this has the effect of increasing the current through transistors 30 and 31. The greater flow of current through transistor 30 causes the potential of connection 32 to become more positive and consequently an increased current through transistor 22.

The greater flow of current through transistor 31 operates, at the same time, to produce a potential in the connection 34 by which the transistor 23 is retained in the partially conducting state. Further positioning of the sliding contact 15 along the potentiometer winding 16 causes, finally, that the transistor 22 and 23 exhibit identical resistance values. Since the resistors 20 and 21 have also identical values, current ceases to flow in the bridge 24, under these circumstances, and as a result the positioning motor 23 comes to rest. This position of the motor, however, corresponds precisely to the increased dispensing rate associated with the increased rate or speed of the carrying vehicle. Provided that this increased vehicle speed is maintained constant, the disc 7 will be positioned such that a positive value lies opposite the indicator 9.

If, on the other hand, the vehicle carrying the dispensing arrangement decreases its speed, the tachometer operates again to produce a positive potential at the connection 29, whereby the current through transistor 30 and 31 is increased.

The increased current through transistor 30 causes a positive potential at the connection 32, and as a result the transistor 22 becomes less conducting. The increased current through transistor 31, on the other hand, causes transistor 23 to become more conducting, in the manner such that the direction of the current through the motor 13 and resistor 20 corresponds to the arrow 35. Accordingly the current through the motor 13 is oppositely directed to that prevailing in the previous example. The disc 7 is, therefore, rotated in the direction by which the "0" digit moves toward the indicator 9, and, in the event the vehicle speed is less than the normally designated speed, the disc will be positioned so that negative values are indicated.

With the new decreased speed, the sliding contact 15 is positioned with respect to the potentiometer winding 16 so that it acquires a positive potential. This action operates as a feedback in the circuit by which the speed of the motor 13 is decreased to a null value. This occurrence is based on the condition that the potential in connection 29 due to the decreased vehicle speed, is again compensated. With this new position of the motor 13, the hydraulic valve 6 is in the state which corresponds to the decreased speed of the vehicle.

In the embodiment shown in FIGURES 5–6, a movable slide 36 is operated by a double acting hydraulic cylinder 37. Through its gating function, the slide increases or decreases the opening 38 through which the material to be dispensed passes. In this embodiment the conveyor belt 39 operates at constant speed. The calibration of the slide position is such that at the normally designated speed of the vehicle carrying the dispensing arrangement, the slide 36 covers half of the maximum opening possible. As in the preceding examples, the stimuli to the control circuit of FIGURE 6 are provided by the tachometer 25, while the feedback is realized from the sliding contact 15 of the potentiometer 16. The stimuli and feedback operate in conjunction with the four-way magnetic valve so that the hydraulic cylinder is actuated with pressurized oil through either the feed line 41 or 42. In this manner the piston 43 is pushed either downward or upward, respectively, and as a result the slide 36 is either lowered or raised.

Corresponding to a normally designated speed of the vehicle, the sliding contact 28 is located at a null position of the potentiometer 27. The arrangement is such that the fluid flow through valve 40, at this null position, is half its maximum value. When the slide 36 is fully closed, the fluid flow through the valve is at its minimum value, while it is at its maximum value when the slide is fully open.

If, now, the vehicle speed is increased above its normally designated value whereby the slide 36 is at its halfway position, the connection 41 becomes positive as a result of the action of the tachometer 25. This causes the current through transistor 42 to decrease, whereby connection 43 becomes more negative and the current through transistor 44 is decreased. The fluid flow through valve 40 is, thereby, increased, and as a result the piston 43 as well as slide 36 are raised to produce a greater dispensing rate corresponding to the increased speed of the vehicle.

In order to realize the proper balancing and feedback effects, the sliding contact 15 of the potentiometer 16 is coupled to the piston rod 45. Due to the position of the piston rod 45, the sliding contact 15 becomes located so that it taps a negative potential from the potentiometer winding 16. This operates to reduce the positive potential in connection 41 until full compensation is obtained, in the manner similar to that described in the preceding embodiment. This compensating procedure causes the fluid flow through the valve 40 to diminish until it ceases entirely. At this point the conditions of the circuit and dispensing mechanism corresponds to the increased speed of the vehicle.

In the event that the vehicle speed is now decreased, the potential of connection 41 becomes less positive due to the reduced speed of the tachometer 25. The current through transistor 42 is, therefore, increased, whereby the connection 43 becomes more positive and transistor 44 becomes less conducting. As a result the fluid flow through valve 40 is such that the piston 43 and slide 36 are moved downward in the closing direction.

Through its coupling with the sliding contact 15 of potentiometer 16, the lowered slide comes to rest at a stable position. When the piston 43 becomes lowered, the piston rod 45 positions the sliding contact so that it attains a more positive potential, and this affects the circuit in a manner such that the fluid flow through valve 40 becomes diminished until it ceases altogether. At this point the slide 36 has attained the position in which the smaller opening 38 corresponds to the decreased speed of the vehicle.

The control circuit of FIGURE 4 may also be applied to actuate the slide 36 in the embodiment of FIGURE 5. In such an arrangement, the rotational motion of the motor 13 may be converted to translational motion by means of a gear rack coupled to the slide 36. Under this condition, however, the positioning motor 13 would have to be capable of greater power output than that required for the application in conjunction with FIGURE 1.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. A movable material dispensing arrangement comprising, in combination, a movable vehicle; storage means mounted on said vehicle for storing the material to be dispensed; dispensing means also mounted on said movable vehicle for dispensing material from said storage means; adjusting means for adjusting the rate of dispension of said dispensing means, said adjusting means associated with said dispensing means; electromechanical control means actuated during movement of said vehicle and adapted to generate electrical control signals depending on and characteristic of the speed of movement of said vehicle, said electromechanical control means including electrical speed sensing means for sensing the speed of said vehicle and variable resistor means for varying the controlling function of said electromechanical control means; and operating means actuated by said control means for operating said adjusting means in dependence upon the speed of said vehicle in such a manner that the amount of material dispensed by said dispensing means varies in accordance with variations in the speed of said vehicle, whereby said material from said storage means is dispensed as a predetermined function of the speed of said vehicle through direct and automatic control of said operating means by said control means providing automatic control signals to said operating means in dependence upon the speed of said vehicle.

2. An arrangement according to claim 1, wherein said operating means are constructed so as to vary the amount of material dispensed in direct proportions to variations of speed of said vehicle whereby the amount of material dispensed per unit length of movement of said vehicle is maintained constant.

3. A movable material dispensing arrangement according to claim 1, wherein said dispensing means comprises a conveyor in combination with an opening in said storage means, said material to be dispensed being transferred through said opening and onto said conveyor, and wherein said adjusting means is associated with said conveyer for regulating the speed thereof in dependence upon the speed of said vehicle.

4. A movable material dispensing arrangement according to claim 1, wherein said dispensing means comprises a conveyor in combination with a variable opening in said storage means, said material to be dispensed being transferred through said opening and onto said conveyor, and wherein said adjusting means is associated with said variable opening for adjusting the size of said opening in dependence upon the speed of said vehicle.

5. A movable material dispensing arrangement according to claim 4, wherein said adjusting means includes hydraulic means for adjusting the size of said opening.

6. A movable material dispensing arrangement according to claim 5, wherein said hydraulic means for adjusting the size of said opening comprises a double-acting hydraulic cylinder and piston, and a hydraulic valve for controlling said piston, said piston operating to vary the size of said opening.

7. A movable material dispensing arrangement according to claim 1, wherein said operating means includes adjustable hydraulic drive means for driving said dispensing means, and wherein said adjusting means includes a hydraulic valve for adjusting said hydraulic drive means.

8. A movable material dispensing arrangement according to claim 7, wherein said hydraulic means for driving said dispensing means comprises a hydraulic motor coupled to said dispensing means; hydraulic fluid for actuating said hydraulic motor and conduit means for said fluid; a hydraulic pump for pumping said fluid to said motor through said conduit means and said hydraulic valve; and a reservoir for retaining any excess quantity of said fluid and serving as a source of said fluid.

9. A movable material dispensing arrangement according to claim 1, wherein said control means comprises electromechanical means for generating control signals for actuating said operating means which in turn operate said adjusting means in dependence upon the speed of the vehicle.

10. A movable material dispensing arrangement comprising, in combination, a movable vehicle; storage means mounted on said vehicle for storing the material to be dispensed; dispensing means also mounted on said movable vehicle for dispensing material from said storage means; adjusting means for adjusting the rate of dispension of said dispensing means, said adjusting means associated with said dispensing means; electromechanical potentiometer means associated with said adjustng means, said potentiometer being connected to a voltage supply and providing a voltage as a function of the disposition of said adjusting means; a tachometer providing voltage signals proportional to the vehicle speed; an algebraic summing circuit having two inputs and an output equal to the difference between said two inputs, one input being connected to said tachometer and the other input being connected to said potentiometer; motor means associated with said adjusting means and actuated by the output of said summing circuit so that said motor means actuates said adjusting means and said potentiometer in dependence upon said voltage signals provided by said tachometer; and operating means actuated by said motor means for operating said adjusting means in dependence upon the speed of said vehicle in such a manner that the amount of material dispensed by said dispensing means varies in accordance with variations in the speed of said vehicle.

11. A movable material dispensing arrangement comprising, in combination, a movable vehicle; storage means mounted on said vehicle for storing the material to be dispensed; dispensing means also mounted on said movable vehicle for dispensing material from said storage means; adjusting means for adjusting the rate of dispension of said dispensing means, said adjusting means associated with said dispensing means; electromechanical potentiometer means associated with said adjusting means, said potentiometer being connected to a voltage supply and providing a voltage as a function of the disposition of said adjusting means; speed sensing means providing voltage signals proportional to the vehicle speed; an algebraic summing circuit having two inputs and an output equal to the difference between said two inputs, one input being connected to said tachometer and the other input being connected to said potentiometer; motor means associated with said adjusting means and actuated by the output of said summing circuit so that said motor means actuates said adjusting means and said potentiometer in dependence upon said voltage signals provided by said tachometer; and operating means actuated by said motor means for operating said adjusting means in dependence upon the speed of said vehicle in such a manner that the amount of material dispensed by said dispensing means varies in accordance with variations in the speed of said vehicle.

References Cited

UNITED STATES PATENTS 2,872,080   2/1959   Thene _____ 222—178

FOREIGN PATENTS 885,126   12/1961   Great Britain.

ROBERT B. REEVES, *Primary Examiner.*

HADD S. LANE, *Assistant Examiner.*